J. Glenert.
Fermenting Vat.
N° 66,701. Patented Jan. 16, 1867.
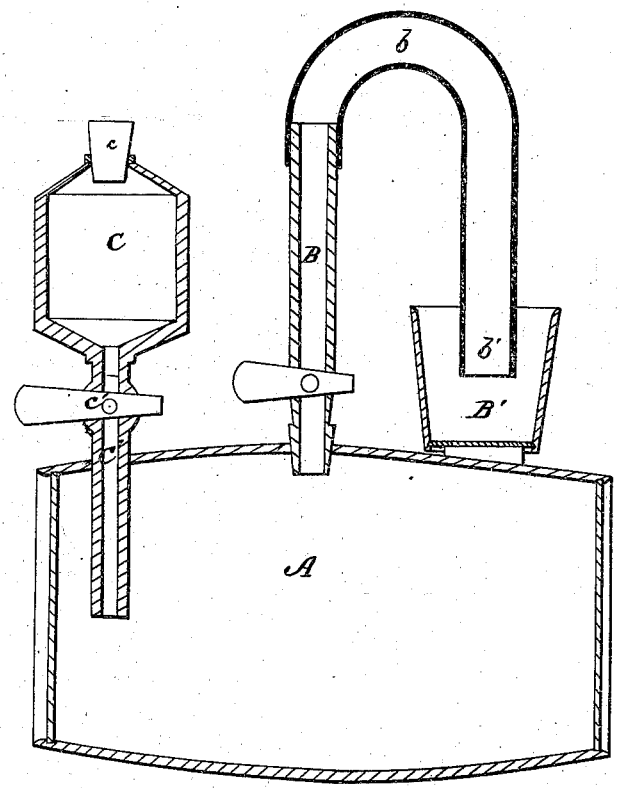
Witnesses:
C. R. Pratt
Chas H. Poyle
Inventor:
J. Glenert
W. Randolph & Co.
Attys

United States Patent Office.

JOHN GLENERT, OF WASHINGTON, MISSOURI.

Letters Patent No. 66,701, dated July 16, 1867.

---

IMPROVED CASK FOR FERMENTING WINE.

---

*The Schedule referred to in these Letters Patent and making part of the same.*

---

TO ALL WHOM IT MAY CONCERN:

Be it known that I, JOHN GLENERT, of Washington, in the county of Franklin, and State of Missouri, have invented a new and useful Improvement in Air-Tight Wine-Fermenting Apparatus; and I do hereby declare that the following is a full and clear description thereof, reference being had to the accompanying drawings, and to the letters of reference marked thereon.

This invention relates to an apparatus for the fermentation of wine, in which said apparatus arrangements are provided for the exclusion of air from the cask during fermentation, and also for the introduction of new wine, so as to keep the cask full, without at the same time admitting a quantity of air.

To enable those skilled in the art to make and use my improved apparatus I will proceed to describe its construction and operation.

The accompanying drawings represent a sectional elevation of the improved apparatus.

A is the cask or barrel in which the wine is placed to be fermented, and at the commencement of the fermentation it is supposed to be full. As some vent must be supplied to the cask for the escape of the froth during the fermentation, it is provided with the discharge pipe B driven into the bung-hole, and from the upper end of this tube or pipe a flexible tube, $b$, conducts the escaping scum into the tub B' secured to the top of the cask. The end $b'$ of the flexible tube is to be submerged in the tub B' so as to prevent air from entering the cask through the aperture provided for the escape of the scum. As the discharge of the scum from the fermenting liquid reduces the bulk of the fluid within the cask, it becomes necessary to refill it, in order to produce a superior article of wine, and this is accomplished in the following manner: A cup, C, is placed on top of and connected with the cask by means of the pipe C'. The stop-cock $c$ above the cup is to be opened to fill the cup, and then closed, while the cock $c'$ is opened to allow the new wine thus poured in to run down into the cask. Thus an entrance is effected for the new fluid, while the air is wholly excluded during the operation.

Having described my invention, what I claim is—

1. The combination and arrangement of the cask A, the pipe B $b$, and tub B', as and for the purpose set forth and described.

2. The cask A, and the filling device C C' $c$ $c'$, when combined in the manner and for the purpose set forth.

In testimony of which invention I hereunto set my hand and seal in presence of—

JOHN GLENERT.

Witnesses:
 M. RANDOLPH,
 GEO. P. HERTHEL, Jr.